(No Model.) 2 Sheets—Sheet 2.
G. A. BARNARD.
SEPARATOR.
No. 416,889. Patented Dec. 10, 1889.
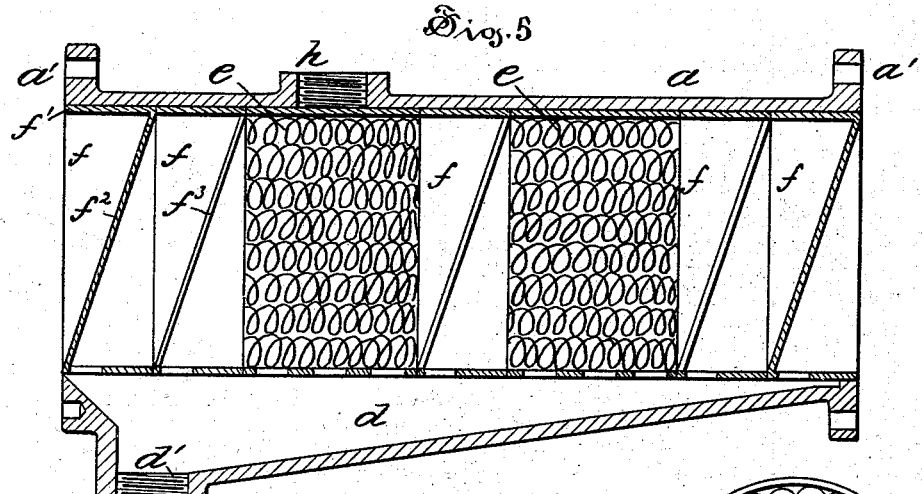
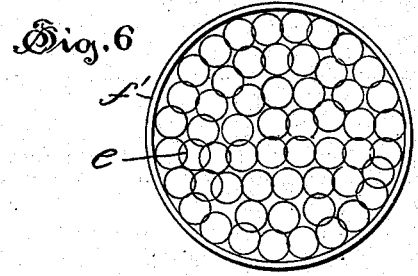
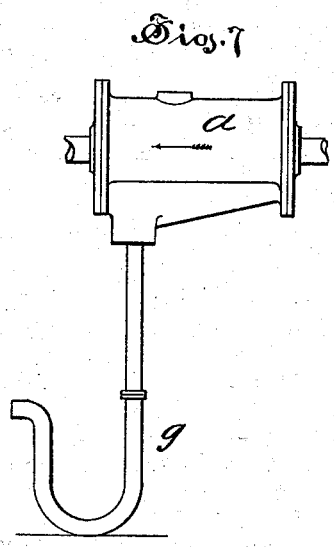
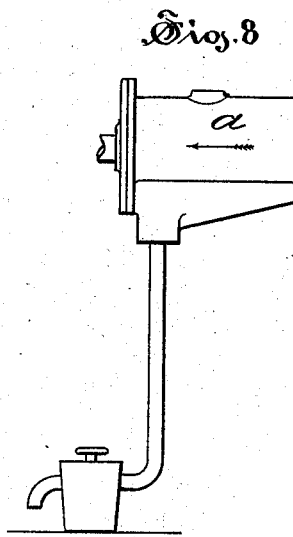
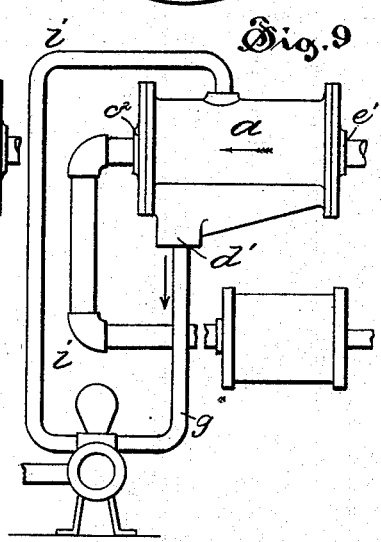
Witnesses:
Harry R. Williams.
Arthur B. Jenkins.
Inventor.
George A. Barnard,
by Simonds & Burdett,
Attys

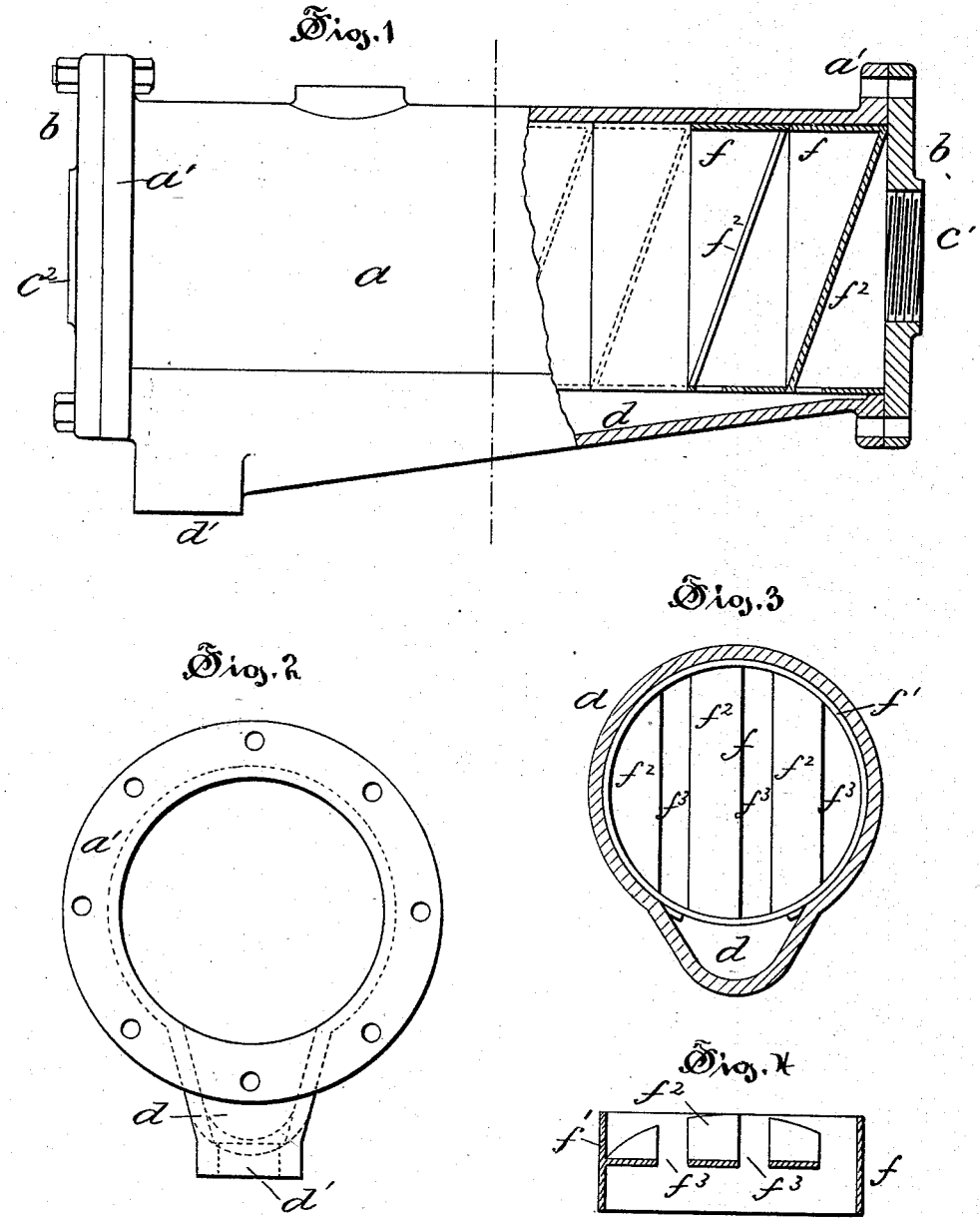

UNITED STATES PATENT OFFICE.

GEORGE A. BARNARD, OF NEW YORK, N. Y.

SEPARATOR.

SPECIFICATION forming part of Letters Patent No. 416,889, dated December 10, 1889.

Application filed June 12, 1889. Serial No. 314,180. (No model.)

*To all whom it may concern:*

Be it known that I, GEORGE A. BARNARD, of New York, in the county of New York and State of New York, have invented certain new and useful Improvements in Steam Separators and Purifiers, of which the following is a full, clear, and exact description, whereby any one skilled in the art can make and use the same.

The object of my invention is to provide an apparatus for separating entrained water from live steam at a point between the boiler and the engine or other device in which the steam is used, and also for separating oil and other foreign particles from waste steam or from live steam by mechanical means, so as to render the steam usable for boiler-feeding, dyeing, or other purposes.

My invention consists in the combination of the shell with its several inlets and outlets and the sectional baffle-plates of peculiar construction.

It further consists in the combination of parts making up the separator, extractor, and pipe-connections by means of which the separator may be used in connection with a surface condenser; and it further consists in details of the several parts making up the device as a whole and in their combination, as more particularly hereinafter described, and pointed out in the claims.

Referring to the drawings, Figure 1 is a side elevation with parts broken away to show the interior of my improved separator. Fig. 2 is a detail end view of the same. Fig. 3 is a detail end view of one of the baffle-plates. Fig. 4 is a detail view, in central section, of a baffle-plate. Fig. 5 is a detail view, in section, of a modified form of the separator. Fig. 6 is a detail end view of the wire baffle. Fig. 7 is a detail diagram view illustrating the device for removing waste material from the separator when used in connection with exhaust-steam, as for heating purposes. Fig. 8 is a diagram view illustrating the device for removing the waste material, water, &c., when the separator is used in connection with live steam. Fig. 9 is a detail view of the device, showing its method of connection with a pump when used in connection with a surface condenser, the object of this device being to balance the vacuum, so as to render the pump operative to remove water, grease, &c.

In the accompanying drawings, the letter $a$ denotes the shell of the separator, that is made, preferably, of iron cast to shape with flanges $a'$, on the opposite ends of which the end plates $b$ may be secured, as by means of bolts. Through one end plate is formed the inlet-opening $c'$ and through the other the outlet $c^2$, the chamber running lengthwise of the shell and being for the main part circular in cross-section, except at the bottom of the chamber, where a receiver $d$ is formed by a trough-like depression with its bottom wall sloping from the inlet toward the outlet end of the shell. In the lowest point of the bottom of the receiver is the wasteway $d'$, and this is provided with a threaded socket in which may be secured the threaded end of a waste or drip pipe leading to any suitable outlet.

The chamber of the separator is provided with a series of baffles, that may consist either of a mass of wire $e$, composed of a number of spirals laid together or interwoven, so that they present obstructions to the passage of steam, while leaving openings of sufficient area in proportion to the solid part to enable steam to pass completely through the separator without becoming condensed.

Instead of the wire baffle I may make use of the baffle-plates $f$, that are composed of an annular rim $f'$, with an angular diaphragm $f^2$ running diagonally across the rim from the top of the front edge to the back of the bottom edge, this diaphragm being formed with a series of openings $f^3$ for the passage of steam, arranged in alternation with the solid parts of the plate, and these diaphragms are so arranged that in successive plates the openings break joints with the solid parts, so as to cause the steam to take a somewhat tortuous course in passing through the separator. It is by contact of saturated steam with these plates that entrained water is removed and caused to fall to the bottom of the chamber and to flow out through holes that are formed in the bottom of each plate and communicating with the receiver $d$. In this receiver the water is gathered and flows to its lowest point out of the waste-outlet $d'$. In like manner foreign particles, as oil or other substances, are mechanically removed by the contact of the steam with the baffle or baffle-plates, and flow out in the manner above described.

A peculiar advantage of the separator is that it may be conveniently made of any length desired and be filled with the sectional baffle-plates, that are made in regular sizes, so that a separator may contain any desired number of such plates, determined by the special work to be done. The baffle-plates may be used alone or in alternation with masses of wire baffle, the proportions of openings for the steam being always larger than the area of the inlet-pipe through which the steam flows into the separator.

When the separator is used in connection with an exhaust-steam apparatus, the waste-pipe $g$ from the waste-outlet of the separator may be bent into form of a trap and the water allowed to flow out by gravity into any desired outlet.

When the separator is used in connection with live steam, the waste-outlet is connected, preferably, to a steam-trap, which will allow any desired pressure of steam to be used without any danger of waste.

When used in connection with a surface condenser, the separator is provided with not only the waste-outlet from the receiver, but also with the outlet $h$ through the upper wall of the shell for a steam-connection $i$ to the suction side of a pump, the waste-connection entering also the section of the pump. The object of providing such a connection is to balance the vacuum formed in the surface condenser, and of course extending into the separator, with a vacuum formed by the pump, so as to leave the entrained water and oil that is mechanically separated from the steam free to flow to the pump by the action of gravity, the pump being located on a level below the separator. By the operation of the pump the water or oil is forced to any desired place.

I claim as my invention—

1. In a separator, in combination with the tubular shell having end plates secured thereto, the receiving-chamber having a waste-outlet and a sloping bottom extending along the shell and underlying the baffle-plates, the sectional baffle-plates having the diaphragms with steam-openings, and a waste-opening communicating with the receiving-chamber, all substantially as described.

2. In a separator, in combination with the tubular shell having the flanged end and the receiving-chamber having the sloping bottom, the waste-outlet, the sectional baffle-plates having each an annular rim, and angular diaphragm with steam-openings and with waste-opening communicating with the receiving-chamber, all substantially as described.

3. In combination with a condenser, the separator having the steam inlet and outlet and the waste-outlet and steam-connection, the steam-pipe connecting the separator and the suction side of a pump, and the waste-pipe also connecting the separator and the suction side of the pump that is located below the level of the separator, all substantially as described.

4. In combination with a mechanical separator composed of a tubular shell having flanged end and a receiving-chamber with sloping bottom and waste-outlet, the sectional baffle-plates with inclined diaphragms with steam-passages and waste-outlets, the end plate connected to the shell, the pipe-connections from the steam-space and also from the receiving-chamber to the suction side of a pump, and a condenser to which the separator is connected on the outlet side, all substantially as described.

GEO. A. BARNARD.

Witnesses:
E. L. HARDIE,
THOMAS C. WOOD.